US011224972B2

(12) United States Patent
Lin et al.

(10) Patent No.: US 11,224,972 B2
(45) Date of Patent: Jan. 18, 2022

(54) STATE MACHINE FOR DYNAMIC PATH PLANNING

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 16/692,932

(22) Filed: Nov. 22, 2019

(65) Prior Publication Data

US 2021/0154842 A1    May 27, 2021

(51) Int. Cl.
*B25J 9/16* (2006.01)

(52) U.S. Cl.
CPC ............. *B25J 9/1666* (2013.01); *B25J 9/161* (2013.01); *B25J 9/1676* (2013.01); *B25J 9/1697* (2013.01); *G05B 2219/50391* (2013.01)

(58) Field of Classification Search
CPC ........ B25J 9/1602; B25J 9/161; B25J 9/1628; B25J 9/163; B25J 9/1646; B25J 9/1656; B25J 9/1664; B25J 9/1666; B25J 9/1674; B25J 9/1676; B25J 9/1687; G05B 19/045; G05B 2219/40476; G05B 2219/40512; G05B 2219/40516; G05B 2219/40517; G05B 2219/40521; G05B 2219/40523; G05B 2219/39082; G05B 2219/39091; G05B 2219/13009
See application file for complete search history.

(56) References Cited

U.S. PATENT DOCUMENTS

| | | |
|---|---|---|
| 8,340,820 B2 | 12/2012 | Nair |
| 8,577,499 B2 | 11/2013 | Eliasson |
| 9,073,210 B2 | 7/2015 | Nakajima et al. |
| 9,827,675 B2 | 11/2017 | Moridaira |
| 10,062,294 B2 | 8/2018 | Kunzi et al. |
| 10,131,053 B1 | 11/2018 | Sampedro et al. |
| 10,207,406 B2 | 2/2019 | Maeda |
| 10,293,485 B2 | 5/2019 | Sinyavskiy et al. |

(Continued)

FOREIGN PATENT DOCUMENTS

| | | |
|---|---|---|
| CN | 106003043 A | 10/2016 |
| WO | 2018188200 A1 | 10/2018 |

*Primary Examiner* — Spencer D Patton
(74) *Attorney, Agent, or Firm* — John A. Miller; Shumaker, Loop & Kendrick, LLP (57) ABSTRACT

A state machine controller to dynamically plan a robot's path. An industrial robot such as a multi-arm articulated robot operates in a workspace according to a program. A sensor or camera monitors the workspace and detects any object, such as a person, approaching or entering the workspace. The sensor provides input to the state machine controller, which includes states of; track current path, change speed, and replan path. When an object approaches or enters the workspace, the state machine determines if a transition to the change speed state is necessary. After reducing robot speed in the change speed state, the state machine can resume the original path and speed if the object has cleared the workspace, further reduce speed to zero if necessary to avoid a collision, or transition to the replan path state to compute a new path to the goal position which avoids the object in the workspace.

20 Claims, 4 Drawing Sheets

(56) References Cited

U.S. PATENT DOCUMENTS

| | | | |
|---|---|---|---|
| 2011/0098874 A1* | 4/2011 | Choi | ............... B25J 9/1664 |
| | | | 701/26 |
| 2018/0362028 A1 | 12/2018 | Prokhorov | |
| 2019/0001504 A1 | 1/2019 | Kogan et al. | |
| 2019/0138009 A1 | 5/2019 | Saito et al. | |
| 2019/0143518 A1 | 5/2019 | Maeda | |

* cited by examiner

STATE MACHINE FOR DYNAMIC PATH PLANNING

BACKGROUND

Field

The present disclosure relates to the field of industrial robot motion control and, more particularly, to a state machine controller for dynamically planning a robot's path, where object sensors stream workspace data to the state machine and the state machine determines states and transitions, and the states include; track current path, change speed, and replan a new path.

Discussion of the Related Art

The use of industrial robots to repeatedly perform a wide range of manufacturing and assembly operations is well known. In some robot workspace environments, it is possible for a human or a vehicle such as a forklift to pass through the motion field of the robot. Collisions between the robot and a human, vehicle or other obstacle must absolutely be avoided.

Prior art techniques for controlling the robot, in applications such as those discussed above, typically involve the use of predefined "safety zones". One type of safety zone defines an area where a human operator must remain, and the robot is correspondingly programmed to avoid the safety zone at all times. Another type of safety zone uses sensors to detect the presence of a person or another object within the safety zone and, if such an obstacle is present, the robot is prevented from entering the safety zone, usually meaning that the robot has to stop. Yet another type of safety zone defines a zone of allowable operation by the robot, and people and other objects must be prevented from entering the robot's operational zone, typically by the use of safety fences or other physical barricades.

Although the techniques discussed above are normally effective in preventing collisions between a robot and any type of obstacle, they rely on predefined safety zones which designated spaces where the robot can or cannot operate, and the techniques cannot deal with obstacles which may move into the robot's operational workspace at arbitrary times, locations, velocities, etc. Furthermore, safety zone techniques restrict the mobility of the robot.

A state machine is a mathematical model of computation. It is an abstract machine that can be in exactly one of a finite number of states at any given time, in response to some external inputs. It is known to use state machines for collision avoidance in applications such as autonomous road vehicles, mobile robots and unmanned aerial vehicles. However, these and other applications of state machines have not considered the states and transitions necessary for seamlessly adapting to obstacles moving into and out of the path of an articulated robot.

In light of the circumstances described above, there is a need for an improved robot controller which uses a state machine for dynamic path planning.

SUMMARY

In accordance with the teachings of the present disclosure, a state machine controller to dynamically plan a robot's path is disclosed. An industrial robot such as a multi-arm articulated robot operates in a workspace according to a defined program. A sensor or camera monitors the workspace and detects any object—such as a human, a forklift or a mobile robot—approaching or entering the workspace. The sensor provides input to the state machine controller, which includes states of; track current path, change speed, and replan path. When an object approaches or enters the workspace, the state machine determines if a transition to the change speed state is necessary. After reducing robot speed in the change speed state, the state machine can resume the original path and speed if the object has cleared the workspace, further reduce speed to zero if necessary to avoid a collision, or transition to the replan path state to compute a new path to the goal position which avoids the object in the workspace.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a state machine controller for dynamically planning a robot's path is merely exemplary in nature, and is in no way intended to limit the disclosed devices and techniques or their applications or uses.

It is well known to use industrial robots for a variety of manufacturing, assembly and material movement operations. Some types of robot operations—such as those where a robot is used to pack or unpack items on pallets in a warehouse—are performed in open spaces where a person, a forklift truck or an autonomous robot could enter the workspace. In applications such as this, it is impractical to define a safety zone where the robot can safely work without risk of collision with an object, because the workspace includes areas that require occasional access and therefore cannot be fenced off to exclude all people and vehicles. In these applications where programming the robot to stay out of a safety zone is not an option, and where humans or other objects may randomly appear in the workspace, an improved technique for dynamically planning the robot's path to avoid object collisions is needed.

Figure 1:
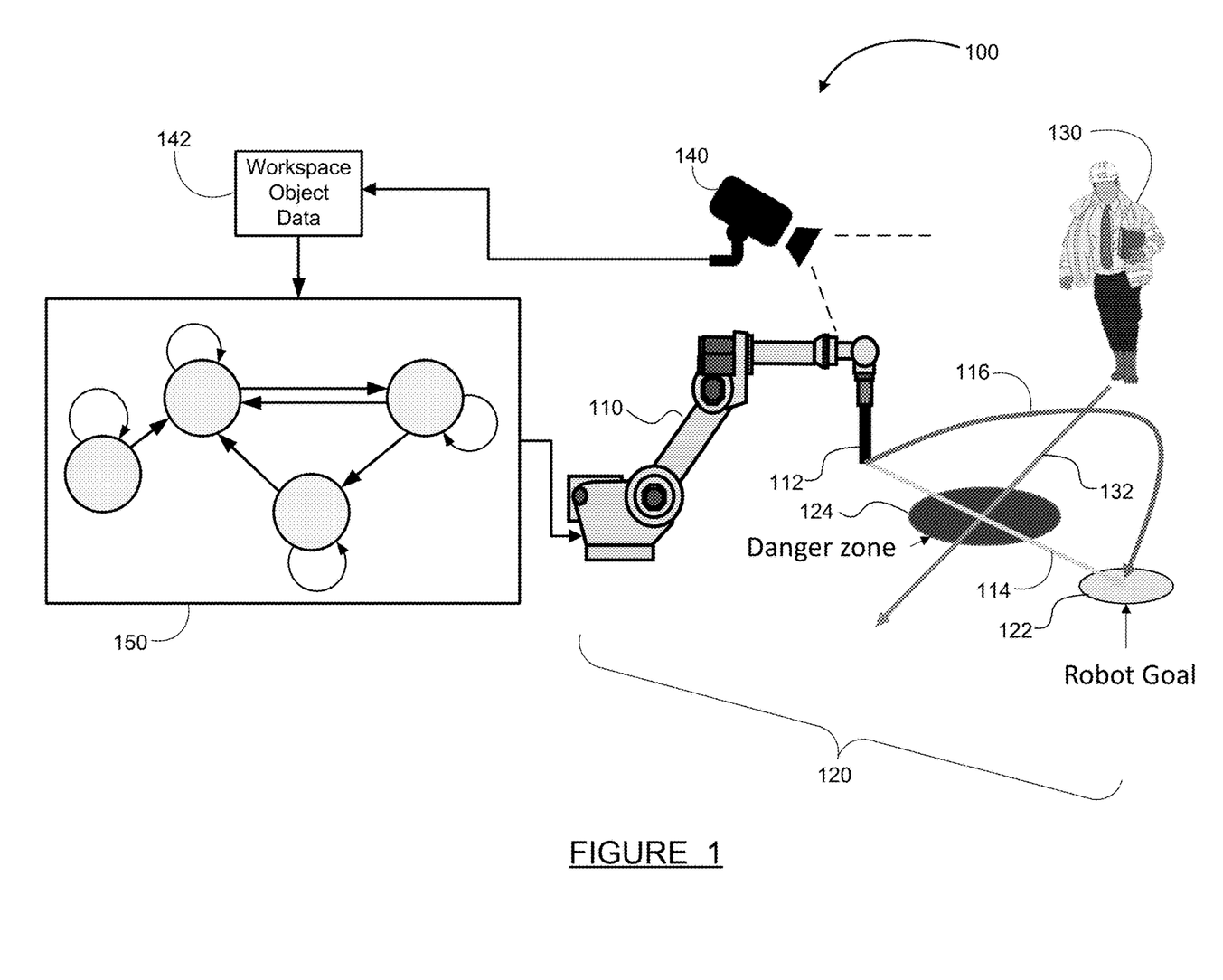
FIG. 1 is an illustration of a system with an industrial robot operating in a workspace, including a sensor and a state machine controller dynamically planning the robot's path based on sensed objects approaching or entering the workspace, according to an embodiment of the present disclosure.

FIG. 1 is an illustration of a system 100 with an industrial robot operating in a workspace, including a sensor and a state machine controller dynamically planning the robot's path based on sensed objects approaching or entering the workspace, according to an embodiment of the present disclosure. The state machine controller in the system 100 provides fast and reliable dynamic path planning to avoid collision of the robot with any object or obstacle that may appear in the workspace.

A finite-state machine or finite-state automaton, or simply a state machine, is a mathematical model of computation. It is an abstract machine that can be in exactly one of a finite number of states at any given time. The state machine can change from one state to another in response to some external inputs and/or when a condition is satisfied; the change from one state to another is called a transition. A state machine is defined by a list of its states, its initial state, and the conditions for each transition.

The system 100 includes a robot 110 operating in a workspace 120. For purposes of discussion, consider that the robot 110 is operating in an open warehouse area, running a program where it picks up items from an inbound conveyor and places each item on a pallet for shipping. This is of course just an example, and the robot 110 could be performing any type of operation. The robot 110 includes a tool 112 (such as a grasper), and the normal program involves moving the tool 112 along an original path 114 to a goal or destination location 122.

It is possible that an object 130, which could be a person, a forklift, or any other object, may move through the workspace 120. Consider that the object 130 moves along an object path 132 which passes through a danger zone 124 in the workspace 120. The danger zone 124 is generally defined as the area between where the robot 110 and the tool 112 are and where they are going. When the object path 132 passes through the danger zone 124, it is desirable to compute a new path 116 rather than just stop the robot 110 and wait. The danger zone 124 is shown in two dimensions in FIG. 1, but could also be computed in three dimensions, where in some applications it may be advantageous to compute a new path which goes over object 130.

One or more sensor(s) 140 is provided having a field of view covering the workspace 120. The sensor(s) 140 may include one or more of a camera, a radar sensor, a LiDAR sensor, an ultrasonic sensor, an infrared sensor, or other object detection sensors. The sensor(s) 140 are capable of determining at least the presence and location of the object 130, and optionally the general size of the object 130, and the object's velocity. The sensor(s) 140 provide data to a module 142 which converts raw sensor data (e.g., camera images, LiDAR point data, etc.) into object data usable by a robot controller 150. The robot controller 150 is a state machine controller which controls motion of the robot 110 in a manner discussed in detail below.

Figure 2:
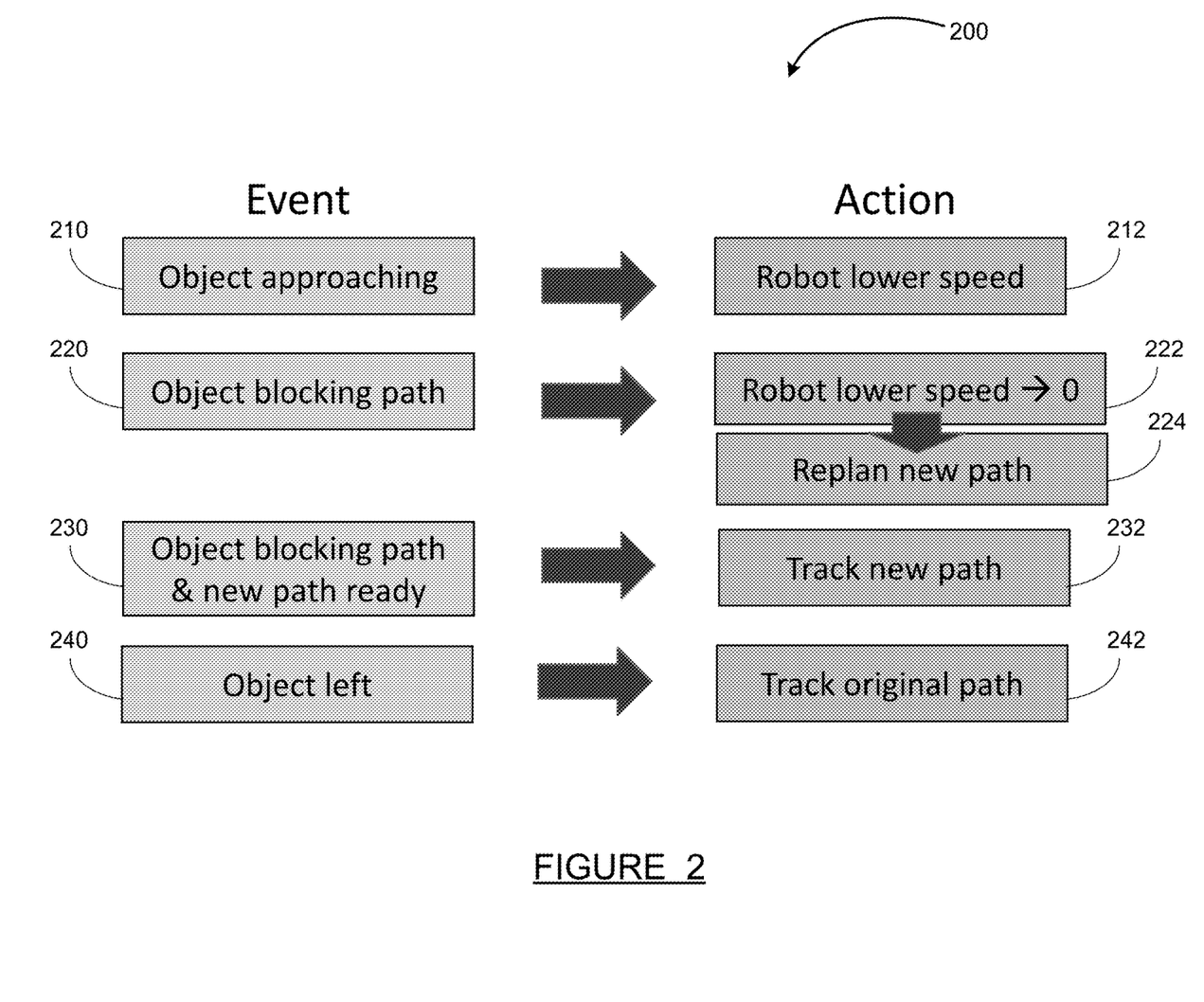
FIG. 2 is a table of events and corresponding actions describing the basic operational characteristics of the state machine controller of FIG. 1, according to an embodiment of the present disclosure.

FIG. 2 is a table 200 of events and corresponding actions describing the basic operational characteristics of the state machine controller 150 of FIG. 1, according to an embodiment of the present disclosure. The table 200 describes the general strategies employed by the controller 150 in controlling the robot 110. The robot 110 is understood to be running a predefined program, such as for picking and placing items. When no objects are detected by the sensor 140, the controller 150 provides motion commands to the robot 110 according to the predefined program.

At box 210, when the object 130 is detected approaching the danger zone 124, the controller 150 slows the motion of the robot 110 at box 212. Slowing the robot 110 allows the robot 110 to be stopped at a later time, if necessary, without causing excessive braking forces and torques. At box 220, when the object 130 is blocking the original path 114—i.e., the object 130 is occupying the danger zone 124—the controller 150 slows the motion of the robot 110 to zero (stop) at box 222. At box 224, the controller 150 then begins planning a new path which avoids the object 130 and the danger zone 124.

At box 230, when the object 130 is still blocking the original path 114 and the new path 116 is ready (meaning the new path 116 and the corresponding joint motion commands have been computed), the controller 150 provides commands causing the robot 110 to track the new path 116 at box 232. By using the new path 116, the robot 110 can still continue to work, even when the object 130 is located in the danger zone 124 and/or along the original path 114. At box 240, when the object 130 has left the danger zone 124 and the original path 114 is clear, the controller 150 provides commands causing the robot 110 to resume tracking the original path 114 at box 242.

Figure 3:
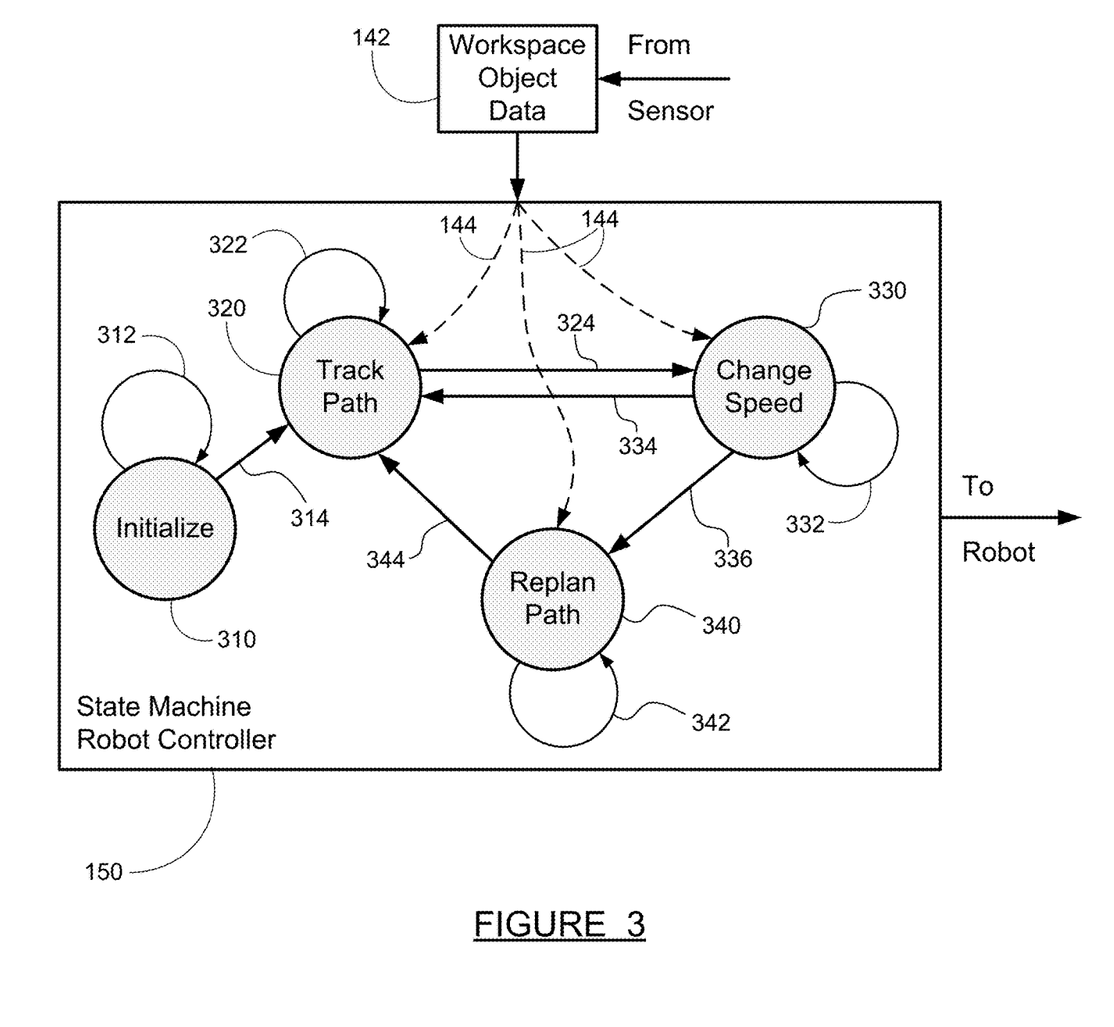
FIG. 3 is a state diagram illustrating the states and transitions of the state machine controller of FIG. 1, according to an embodiment of the present disclosure.

FIG. 3 is a state diagram illustrating the states and transitions of the state machine controller 150 of FIG. 1, according to an embodiment of the present disclosure. The controller 150 receives object data from the module 142 as discussed previously. The object data from the module 142 includes at least the location of the object 130 detected in the workspace 120, and may also include the size and shape of the object 130, and/or the velocity of the object 130. Different types and combinations of the sensor(s) 140 are capable of providing different types of object data.

The controller 150 is configured as a state machine having an initialize state 310 and three other operational states—a track path state 320, a change speed state 330 and a replan path state 340. The object data from the module 142 is provided to the state machine controller 150 and is available to be used in computations in each of the states 320, 330 and 340, as shown by dashed arrows 144. Based on the status of any objects in the workspace 120, the state machine controller 150 will determine the proper action for the robot 110. It is to be understood that the state machine controller 150 includes a processor and memory, and runs a state machine algorithm with computational steps at a regular time clock frequency, where new object data is provided and new state calculations are performed at each time step.

The initialize state 310 is a state which is entered upon startup of the controller 150 and whenever the controller 150 begins running its program—such as after completing a previous operational run. The initialize state 310 has a transition 312 back to itself, as would be understood by those skilled in the art of state machines. The transition 312 is used when the controller 150 is initializing (booting up, checking communication with the robot 110 and the sensor 140, etc.) and is not yet ready to begin moving the robot 110. When the system is ready, the controller 150 transitions from the initialize state 310 to the track path state 320 via a transition 314. The controller 150 remains in the track path state 320, running the predefined program (such as the item pick and place operation) and transitioning back to itself via a transition 322, as long as no object enters the workspace 120.

When an object enters the workspace 120 indicating a need for reduced robot speed, the controller 150 transitions to the change speed state 330 via a transition 324. At the change speed state 330, the controller can self-transition back to the change speed state 330 via a transition 332, which would be done when calculations are ongoing and a transition to one of the other states is not yet called for. From the change speed state 330, when the appropriate action is determined to be continuing on the current path at the reduced speed, a transition 334 is taken to the track path state 320.

From the change speed state 330, it may be necessary to replan a new path. For example, when the speed has been reduced to zero, and/or the object 130 is located in and possibly stopped in the danger zone 124, the appropriate action is determined to be taking a transition 336 to the replan path state 340. A self-transition 342 may be taken to remain at the replan path state 340, while calculations are being made. When a new path is ready (fully computed), or when the object 130 has left the danger zone 124, a transition 344 to the track path state 320 is taken. When returning to the track path state 320 in this way, the controller 150 instructs the robot 110 to track the original path if the object 130 has left the danger zone 124, or instructs the robot 110 to track the new path otherwise.

Figure 4:
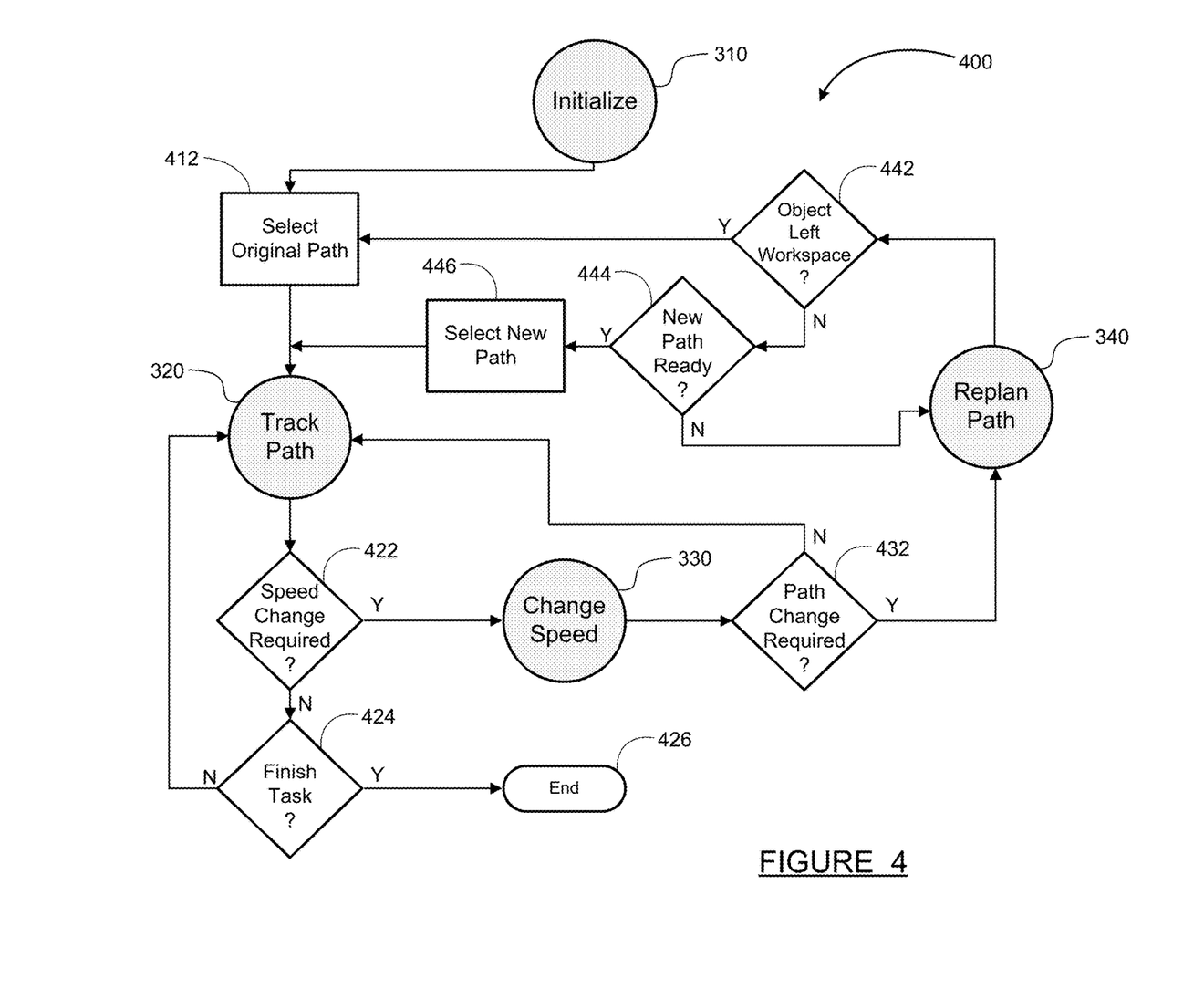
FIG. 4 is a flowchart diagram of a method for dynamically planning a robot's path to avoid collisions with objects in the robot workspace, according to an embodiment of the present disclosure.

FIG. 4 is a flowchart diagram 400 of a method for dynamically planning a robot's path to avoid collisions with objects in the robot workspace, according to an embodiment of the present disclosure. The flowchart diagram 400 is depicted as a collection of the states from the state machine controller 150 discussed above, along with the decisions and actions associated with the states and their respective transitions. The method of the flowchart diagram 400 is programmed in the state machine controller 150.

The method begins at the state 310 where the controller 150 is initialized. After the controller 150 is initialized and ready to run, an original path is selected at box 412 according to the robot's predefined program. The method then transitions to the track path state 320. In the track path state 320, the controller runs the robot through its program (such as a pick and place operation). At decision diamond 422, which is part of the programming of the track path state 320, it is determined whether a speed change is required based on workspace object data from the module 142. If no object was previously present in the workspace 120 and no object is currently present in the workspace 120, then no speed change will be required at the decision diamond 422, and the process will move to decision diamond 424.

At the decision diamond 424, it is determined whether the robot's task is completed. For example, if no more items are arriving on an inbound conveyor, and all items on the conveyor have been moved to shipping pallets, then the task is complete. When the task is complete, the process ends at terminus 426. When the task is not complete, the process remains in the track path state 320, and again checks to determine if a speed change is needed at the next time step.

If, at the decision diamond 422, an object is detected in the workspace 120, approaching the danger zone 124, then a speed change (reduction) is required and a transition to the change speed state 330 occurs. In the change speed state 330, a speed change is first applied based on the object data. For example, a 50% reduction in speed might be applied upon detection of the object 130 approaching but still well clear of the danger zone 124. After the speed change has been applied, but still in the state 330, it is determined whether a path change is also required at decision diamond 432. If no path change is required at the decision diamond 432, then a transition back to the track path state 320 occurs, and the robot program continues to run on the selected path at the reduced speed. The process may run in the track path state 320 at the reduced speed for several time steps before determining that another speed change is needed.

If, at the decision diamond 432 after any speed change, it is determined that a path change is also required, then a transition to the replan path state 340 occurs. In the replan path state 340, planning of a new path is initiated, based on the workspace object data. For example, if the object 130 has entered the danger zone 124 and stopped, then a path such as the new path 116 of FIG. 1 may be calculated. Planning the new path in the replan path state 340 may be done in one of several ways. For example, path points may be identified on a route from the current location of the tool 112 to the location of the goal 122, while avoiding the object 130 based on its location and motion. Once the path points are identified, then a path planning routine may be used to fully define the new path along with the joint motions required to cause the tool 112 to move along the new path, as known in the art. The path planning method to compute a new path based on the object data and the location of the tool 112 relative to the goal 122 can be, but is not limited to, an optimization planning routine, or sampling-searching methods. A stored alternate path may also be selected, where the stored path is a preplanned alternate or an alternate path which was previously computed and used in a similar scenario.

After planning of a new path is initiated in replan path state 340, the process moves on, still in the replan path state 340, to determine whether the object 130 has left the workspace 120 at decision diamond 442. If the object 130 has left the workspace 120, then the process proceeds back to select the original path at the box 412, and transitions back to the track path 320. If the object 130 has not left the workspace 120 at the decision diamond 442, the process moves to decision diamond 444 where it is determined if the new path is fully computed and ready to use. The decision diamonds 442 and 444 are still in the replan path state 340, and are part of the logic used to determine when to transition out of the replan path state 340.

If the new path is not yet fully computed and ready to use, then the process remains in the replan path state 340. If, at the decision diamond 444, the new path is ready to use, then the new path is selected at box 446, and a transition to the track path state 320 occurs. The controller 150 then runs the robot program using the new path in the track path state 320 until the task is completed or a transition to the change speed state 330 occurs.

Using the method of the flowchart diagram 400, the state machine controller 150 can adapt to any situation involving the arrival or departure of an object in the workspace 120. Another example situation is where a new path has been selected (as discussed above), the new path is being used in the track path state 320, and the object leaves the workspace 120. In this case, a speed increase is called for at the decision diamond 422, a transition to the change speed state 330 occurs, and at the decision diamond 432 it is determined that a path change back to the original path is appropriate. The system will transition to the replan path state 340 and re-select the original path via the decision diamond 442 and the box 412. In this manner, speed decreases and increases, and selection of temporary new paths or the original path, may all be handled seamlessly in the state machine controller 150.

In the flowchart diagram 400, other decision diamonds and action boxes could be added, or steps could be rearranged, without changing the basic design of the state machine with its three main operational states of track path, change speed and replan path.

Throughout the preceding discussion, various computers and controllers are described and implied. It is to be understood that the software applications and modules of these computer and controllers are executed on one or more computing devices having a processor and a memory module. In particular, this includes a processor in the object detection module 142 and a processor in the state machine robot controller 150 discussed above. Specifically, the processor in the controller 150 is configured to use the state machine control technique for dynamic path planning in the manner discussed above.

As outlined above, the disclosed techniques for a state machine controller for dynamic planning of a robot's path improve the speed and reliability of robot path planning for collision avoidance when objects having random sizes, trajectories and velocities may enter the robot workspace at any time.

While a number of exemplary aspects and embodiments of the state machine controller for dynamic path planning have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for dynamically planning a path of an industrial robot, said method comprising:
providing a state machine computing system having a processor and memory configured to run a state machine algorithm including a track path state, a change speed state and a replan path state;
providing a sensor system comprising at least one sensor configured to detect objects in a workspace of the robot, said sensor system providing signals to the state machine computing system; and
continuously computing, using the state machine computing system, a path to be followed by a tool on the robot, including identifying workspace object data based on the signals from the sensor system, controlling movement of the tool on a current path in the track path state, transitioning to the change speed state when necessary based on the object data, transitioning from the change speed state to either the track path state using the current path at a new speed or to the replan path state, and transitioning from the replan path state to the track path state using either a new path or an original path.

2. The method according to claim 1 wherein the at least one sensor includes at least one of a camera, a radar sensor, a LiDAR sensor, an ultrasonic sensor or an infrared sensor.

3. The method according to claim 1 wherein identifying workspace object data includes identifying a size and a location of any objects in the workspace, including humans, vehicles, mobile robots or other machines.

4. The method according to claim 3 wherein identifying workspace object data also includes identifying a velocity of any objects in the workspace.

5. The method according to claim 1 wherein transitioning to the change speed state when necessary based on the object data includes determining that a robot speed reduction is necessary based on an object approaching a path of the robot, and determining that a robot speed increase is appropriate based on an object departing the workspace.

6. The method according to claim 1 wherein the change speed state includes setting a new robot speed based on the object data and determining whether a path change is required, where a transition to the track path state occurs when a path change is not required and a transition to the replan path state occurs when a path change is required.

7. The method according to claim 6 wherein the change speed state reduces the robot speed before determining that a path change is required and transitioning to the replan path state.

8. The method according to claim 1 wherein the replan path state includes initiating planning of a new path based on the workspace object data, determining if any previously-detected objects have left the workspace, and determining if the new path is computed and ready to use.

9. The method according to claim 8 wherein planning of the new path includes computing the new path using a path planning routine based on a current robot configuration, a goal robot configuration and the workspace object data, or selecting a previously computed path which was stored in memory.

10. The method according to claim 8 wherein the original path is selected and a transition to the track path state occurs when any previously-detected objects have left the workspace, and the new path is selected and a transition to the track path state occurs when the new path is ready to use.

11. The method according to claim 1 wherein the state machine algorithm also includes an initialize state which is entered upon start-up of the state machine computing system, and the initialize state transitions to the track path state when the computing system is ready to operate the robot.

12. A method for dynamically planning a path of a factory automation device, said method comprising continuously computing, using a state machine computing system, a path to be followed by a tool on the device, including identifying workspace object data based on the signals from a sensor system, controlling movement of the tool on a current path in a track path state, transitioning to a change speed state when necessary based on the object data, transitioning from the change speed state to either the track path state using the current path at a new speed or to a replan path state, and transitioning from the replan path state to the track path state using either a new path or an original path.

13. A state machine dynamic path planning system for an industrial robot, said system comprising:
a sensor system comprising at least one sensor configured to detect objects in a workspace of the industrial robot; and
a state machine robot controller having a processor and memory configured to run a state machine algorithm including a track path state, a change speed state and a replan path state;
where the state machine algorithm is configured to continuously compute a path to be followed by a tool on the robot, including identifying workspace object data based on signals from the sensor system, controlling movement of the robot on a current path in the track path state, transitioning to the change speed state when necessary based on the object data, transitioning from the change speed state to either the track path state using the current path at a new speed or to the replan path state, and transitioning from the replan path state to the track path state using either a new path or an original path.

14. The system according to claim 13 wherein the at least one sensor includes at least one of a camera, a radar sensor, a LiDAR sensor, an ultrasonic sensor or an infrared sensor.

15. The system according to claim 13 wherein identifying workspace object data includes identifying a size and a location of any objects in the workspace, including humans, vehicles, mobile robots or other machines.

16. The system according to claim 13 wherein transitioning to the change speed state when necessary based on the object data includes determining that a robot speed reduction is necessary based on an object approaching a path of the robot, and determining that a robot speed increase is appropriate based on an object departing the workspace.

17. The system according to claim 13 wherein the change speed state includes setting a new robot speed based on the object data and determining whether a path change is required, where a transition to the track path state occurs when a path change is not required and a transition to the replan path state occurs when a path change is required.

18. The system according to claim 17 wherein the change speed state reduces the robot speed before determining that a path change is required and transitioning to the replan path state.

19. The system according to claim 13 wherein the replan path state includes initiating planning of a new path based on the workspace object data, transitioning to the track path state using the original path when any previously-detected objects have left the workspace, and transitioning to the track path state using the new path when the new path is computed and ready to use.

20. The system according to claim 13 wherein the state machine algorithm also includes an initialize state which is entered upon start-up of the state machine robot controller, and the initialize state transitions to the track path state when the controller is ready to operate the robot.

* * * * *